(12) United States Patent
Isaacs

(10) Patent No.: US 6,905,537 B1
(45) Date of Patent: Jun. 14, 2005

(54) MACHINE AND PROCESS FOR FILTERLESS REMOVAL OF PARTICLES AND ORGANISMS FROM AMBIENT AIR, CARPETS AND FURNISHINGS

(76) Inventor: Garry Parkinson Isaacs, 499 Coffee Rd., Walnut Shade, MO (US) 65771

( * ) Notice: Subject to any disclaimer, the term of this patent is extended or adjusted under 35 U.S.C. 154(b) by 105 days.

(21) Appl. No.: 10/616,374

(22) Filed: Jul. 9, 2003

(51) Int. Cl.[7] .............................................. B01D 47/06
(52) U.S. Cl. .............................. 96/282; 96/371; 261/84
(58) Field of Search ........................ 96/281, 282, 286, 96/371; 95/218; 261/84, 85, 87, 88, 89

(56) References Cited

U.S. PATENT DOCUMENTS

| | | | | |
|---|---|---|---|---|
| 1,560,527 A | * | 11/1925 | Bassler ........................ 261/84 |
| 2,022,463 A | * | 11/1935 | Erschen et al. ............... 96/371 |
| 2,221,572 A | * | 11/1940 | Brock et al. .................. 96/333 |
| 3,744,773 A | * | 7/1973 | Velander ...................... 261/88 |
| 4,265,643 A | * | 5/1981 | Dawson ......................... 96/73 |
| 4,469,493 A | * | 9/1984 | Tuovinen et al. ............. 95/201 |
| 4,594,081 A | * | 6/1986 | Kroll et al. ................... 96/235 |
| 4,746,336 A | * | 5/1988 | Mignot ........................ 96/249 |
| 4,833,895 A | * | 5/1989 | Johnson ....................... 62/304 |
| 5,151,112 A | * | 9/1992 | Pike ............................. 96/281 |
| 5,439,618 A | * | 8/1995 | Trapasso ..................... 261/25 |
| 5,925,171 A | * | 7/1999 | Pietrobon .................... 96/342 |
| 6,203,600 B1 | * | 3/2001 | Loreth ........................... 96/40 |
| 6,228,148 B1 | * | 5/2001 | Aaltonen et al. .............. 95/74 |
| 6,228,154 B1 | * | 5/2001 | Pakkala et al. ............... 96/323 |
| 6,383,260 B1 | * | 5/2002 | Schwab ....................... 95/216 |
| 6,425,932 B1 | * | 7/2002 | Huehn et al. ................. 55/471 |
| 6,503,302 B2 | * | 1/2003 | Wong .......................... 96/316 |
| 6,521,027 B1 | * | 2/2003 | Wang .......................... 96/240 |
| 6,576,188 B1 | * | 6/2003 | Rose et al. ................... 422/20 |
| 6,613,129 B2 | * | 9/2003 | Gen ............................. 95/269 |

FOREIGN PATENT DOCUMENTS

JP            55-094614 A   *  7/1980

* cited by examiner

*Primary Examiner*—Frank M. Lawrence

(57) ABSTRACT

A machine and process for filterless wet removal of particles from air, carpets or upholstery, comprised of a suction inlet pipe or other contained conveyance for drawing particle laden air and solvent fluid simultaneously into an impeller, an injection orifice for introducing water or other solvent into the suction, an impeller for atomizing fluid droplets, an impaction anvil to splatter atomized droplets into smaller droplets, an impeller housing configured to create multi-staged low pressure venturi zones to reduce surface tension and enhance entrainment of particles with fluid, a method of causing all dry particles to collide with solvent droplet surfaces, an apparatus of operating an impeller inside a demister and a method of discharging particle laden fluid tangentially to the interior wall of a demister, separating fluid from air and discharging particle laden fluid down a drain and cleaned air back into the original space.

8 Claims, 3 Drawing Sheets

MACHINE AND PROCESS FOR FILTERLESS REMOVAL OF PARTICLES AND ORGANISMS FROM AMBIENT AIR, CARPETS AND FURNISHINGS

DESCRIPTION OF ATTACHED APPENDIX

Not Applicable.

BACKGROUND OF THE INVENTION

This invention relates generally to the field of air purification and vacuum cleaning and more specifically to a machine and process for filterless removal of particles and organisms from ambient air, carpets and furnishings. Cleaning the air we breathe has not been of great concern until the accelleration of the industrial boom of the past half century. Industry and automobiles have introduced volumes of pollutants into the atmosphere causing the need for clean air technology to prevent the pollutants from bothering humanity. Clean air technology has gone through several applications and changes. The history of the development of conditioning air includes the development of the industrial emissions scrubber as well as home air cleaners and conditioners to control temperature, the humidifier or de-humidifier to control humidity, killing live organisms using ultra-violet light and the development of better filters for the collection of airborne particles. Clean air has recently been recognized as an important factor for healthy living and the prevention of diseases such as allergies, asthma, cancer causing radio activity and virus or bacteria related ailments. The pattern of development of home air cleaners has paralleled the development of industrial technologies for emissions control. Emissions scrubbers have been created, using the application of three mainstream technologies for removal of particulates and gases from industrial exhaust. These three mainstream technologies are wet scrubbers, filters and electrostatic precipitation. The need for filterless air cleaning has become more evident with increased public consciousness of the importance of clean air in the home and elsewhere for the prevention of disease and the desire for convenience of cleaning the air and furnishings without the burden of handling the collected pollution laden particles when changing filters, wiping plates, emptying bags etc.

Technology has been developed for the collection of particles from the air by applying the principles of emissions scrubbing introduced for industrial applications. Such technologies and variations thereof include filtered systems, wet systems and electrostatic precipitation such as represented by U.S. Pat. No. 6,503,302, Wang, U.S. Pat. No. 2,221,572, Brock, and U.S. Pat. No. 5,925,171, Pietrobon, respectively. All of such systems require periodical cleaning and/or servicing. Filters have been improved to be effective in collection of particles smaller than 1 micron but the smaller the particles collected, the higher the pressure drop because of flow restrictions caused by finer and finer filters.

A wet cleaning system which is commonly used in industry is the venturi scrubber. The venturi scrubber was originated with the idea of squeezing the fluid and particles together through a high velocity, low pressure narrow neck, as opposed to the wider effect of the fan, to reduce surface tension interference with the mixing process. The venturi method provides substantially improved particle/droplet contacting than the standard wet scrubber when used for mist collection. The contacting is done, however, with the same application and effect as the original fan dust collector in that the particles and droplets are all traveling in the same direction, parallel with one another. Improvements and variations to cause higher effectiveness of venturi scrubbing have been accomplished. U.S. Pat. No. 4,469,49, September 1984, Tuovinen discloses more efficient method for the enhancement of a venturi scrubber. Since mist particles are wetted by pre-moistening they become more readily collected in unidirectional flow because of compatibility with additional fluid surfaces. Accelerating the fluid of the venturi scrubber decreases pressure and surface tension in the fluid which promotes the effect of water/particle absorption. A new variation of the method was introduced in 2001 by Pakkala U.S. Pat. No. 6,228,154 using pods and enhancing the collection of a venturi type system by varying the closure of the throat in the atomizer accompanying a venturi process. Schwab, U.S. Pat. No. 6,383,260, 2002 introduced a means of counterflow within a venturi in an attempt to further enhance venturi collection effectiveness. Both of these methods cause a substantial increase in pressure drop proportional to orifice closure and proportional to the improvement of the collection effectiveness of a venturi scrubber.

Standard wet scrubbers are most often used for dust and large particulate collection. Standard wet scrubbers use either a water bath through which to pass the gases or they may employ some type of droplet particle contacting means within a tank. In the droplet spray application, the droplets are introduced from a nozzle or nozzles at a size of about 40 micron at the top of the scrubber tank and the gases are discharged into the bottom. The droplets and particles are intended to collide within the water curtain and absorb the particles into solution. There have been several variations of particle to droplet contacting of wet scrubbing to improve collection effectiveness. As previously illustrated with other scrubbing methods, wet scrubbing applications have also been applied to vacuum cleaners such as U.S. Pat. No. 6,521,027, Wang, 2003, whereby fluids are scattered and spread to contact airborne particles.

Rotary atomization of fluid droplets will reduce their size to about 10 microns in diameter. It is significant to note that rotary atomization can be made to produce more consistent sized droplets. Varying the speed of the atomizer will effect the size of the droplets. The configuration of the atomizer disk will control the consistency. The rotary atomizer has demonstrated that it is the most effective and efficient method known for droplet size reduction and size control.

Electrostatic precipitation (ESP) is a process where particles are ionically charged at entry with a positive or negative polarity. The passing particles are then attracted to a plate or other device that is oppositely charged where they are collected and denied continuance with the gas stream. Patents such as Dawson U.S. Pat. No. 4,265,643, Loreth U.S. Pat. No. 6,203,600 and Aaltonen U.S. Pat. No. 6,228, 148 use ESP for cleaning ambient air. Such applications collect particles on a plate or other electrostatically charged media, where they can be removed and disposed of at a later time.

An effective way to apply an air filtering application is represented by U.S. Pat. No. 6,425,932, Huechn, Daros and Bourque, issued in 2002. Filters are effective collectors of microscopic particles but they restrict airflow, especially as they become laden with collected particles. Collecting particles in a filter or a plate retains the particles in accessibility to the living environment until the filter is disposed of or the plate is cleaned and the particles disposed of. Particles that are collected by an air cleaning device should be completely removed from a living atmosphere instead of collecting them into a concentrated accumulation in a filter or a plate.

A more desirable and efficient means of removing harmful particles from the air in occupied spaces is naturally a system that removes the particles simultaneously with their collection. Filterless technology can continuously remove particles without reducing airflow.

The development of particle wetting and transfer technology attained a practical limit at 40 micron droplet water nozzle applications in the late 20$^{th}$ century for several reasons, three of which are:

1. The energy requirements to further reduce droplet sizes is costly so efficient methods of droplet size reduction had not been satisfactorily established. 2. Individual demands for better and finer particle size collection was not prominent or did not exist, and 3. Mist collection of super fine, low solubility particles was been difficult because of surface tension and ineffective droplet re-entrainment problems.

A type of mechanical dust collector originated with the injection of water into the intake of a standard air blower with a limited amount of success. Standard blowers have been designed to accomplish the smooth transfer of air without turbulence. Pumps are designed in the same manner and with the same end in mind, that is the smooth, efficient transfer of fluid with the least amount of resistance. The application of such a design for scrubbing will produce, at best, an accidental surface contact or collision of particles with droplets since the particles and droplets are traveling smoothly (by purpose of the design) along the same paths and in the same direction with one another and through wider and wider passages through the blower chamber. This type of scrubber, although having a degree of effectiveness for dust collection has proven inefficient for the collection of gases and therefore has no application. Collisions occurring in the early conventional wet scrubbing system environment have proven to be somewhat inefficient because of the natural dodging action of the particles and droplets from one another. This process also shows insufficient temperature drop for condensing and re-entrainment of solution.

Conventional wet scrubbers show limited efficiency for sulfur dioxide reduction and little effect in the reduction of submicron particle emissions. One reason for the limited collection effect of conventional wet scrubber systems is the interfacial tension of large droplets. The collection of particles is limited and dependent upon contacting on the surface of the droplets. There is also the problem of back mixing. Back mixing is caused by the less than perfect distribution of droplets, large droplets falling faster than small ones and the spray also being applied to the walls of the scrubber chamber and baffles. The deposition of the fluid to the walls and baffles of the system wastes the effect of a large percentage of the scrubbing fluid because fluid surface is decreased with reentrainment of the fluid. Back mixing renders a good deal of the scrubbing fluid useless for collection due to interfacial tension of droplets and surface tension of water curtains formed on the walls. Standard wet scrubbers are largely inefficient because of the dodging effect as particles pass unlike particles or droplets within a gas media without colliding because of the air cushion between the particles and droplets.

Water bath systems are also greatly ineffective for the collection of sub-micron particles since the gas bubble containing the particulates and gases pass through the bath without particles within the bubble contacting with water. Another problem of discharging the particles into the atmosphere is also experienced with wet scrubbers since sufficient drop in temperature is not accomplished to condense the droplets into solution and they are lost into the discharged gas stream.

The collection efficiency of the venturi scrubber severely drops off for the collection of particles below 1 micron in size and, even when using a high pressure drop of as much as 40 inches, less than 80% collection efficiency is observed below 0.5 micron. Major limiting factors in the use of venturi systems are high energy costs to achieve efficiencies in the sub-micron range, the large volume of scrubbing fluid required and the accompanying containment and disposal problems associated therewith.

The use of pneumatics has been unattractive for most scrubbing applications because the high pressure drop required to accomplish the processes results in unacceptably high energy costs. These costs are compounded by the necessity of industry to treat high volumes of gases, thereby making the treatment of a necessary flue gas stream cost prohibitive.

Electrostatic precipation (ESP) has no way of discharging collected particles without periodical cleaning of the collection medium. ESP is shown to be significantly effective in collecting particles larger than 10 micron and fairly effective above 1 micron but additional technology, such as a HEPA filter is required to collect smaller particles. The problems with ESP are similar to wet scrubbing in that the tiny particles have difficulty passing close enough and with enough polarity to collect on the medium due to collisions with other passing particles and the overpowering conveyance of the air carrier. In order to reduce such negative effects, ESP containments have to be larger and larger, making it hard to find room for ESP treatment for occupied spaces to be applied for cleaning air in areas containing more than about 4000 cubic feet Ultraviolet light is commonly applied in air purification applications to kill live airborne organisms. U.S. Pat. No. 6,576,188, Rose demonstrates an application of Ultraviolet light to sterilize surfaces and air. Ultraviolet light methods of air purification kill organisms but do not remove them from the ambient air.

BRIEF SUMMARY OF THE INVENTION

The primary object of the invention is to provide filterless removal of particles and organisms from the air in occupied spaces.

Another object of the invention is to provide a means of air cleaning without the need to change or clean filters or plates.

Another object of the invention is to provide central air cleaning to multiple occupied spaces simultaneously.

Another object of the invention is to provide scalable technology that can be made to handle any desired volume of air or gas.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a machine for cleaning air and objects in occupied spaces comprising: a suction means 21 for introducing particle laden air simultaneously with water or other solvent received from a liquid injection means 22 into the suction means, a motor 37 with drives 38 to produce high rpm impeller 23 rotation and a tip speed in excess of 12,000 feet per minute, an atomizer impeller 23 with side containment means 24 attached to the impeller 23 controlling the direction and path of particles and liquid, said impeller 23 intended for atomizing water droplets in the same process of transfering air, an impaction anvil 25 to receive and splatter droplets discharged at high velocity from the atomizer impeller 23 into smaller droplets, an impeller housing 26 configured with an anvil 25 and multiple flat sides 27 to create multi-staged and narrowed low pressure zones 28 to reduce surface tension, a means of horizontally installing an impeller 23 and housing 25 inside a high pressure demister 29 or other high pressure dewatering vessel, causing all particles passing through the impeller 23 to collide with solvent droplet surfaces, a tangential means 30 of continuously discharging particle laden solvent into a re-entraining water stream provide by a rounded wall 31 of the high pressure demister 29 to a drain 32 and eliminating the need for water baths, filters or collection plates, a vacuum head 33 with a screen 36 for preventing large particles and objects from entering the suction means 21, a coupling means 34 for attaching the suction means 21 to a customary central vacuum system to be used for dry cleaning or wet extraction of particles from carpet and other furnishings such as drapes, bedding and upholstery and a discharge vent 35 for returning cleaned air back to the original space.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
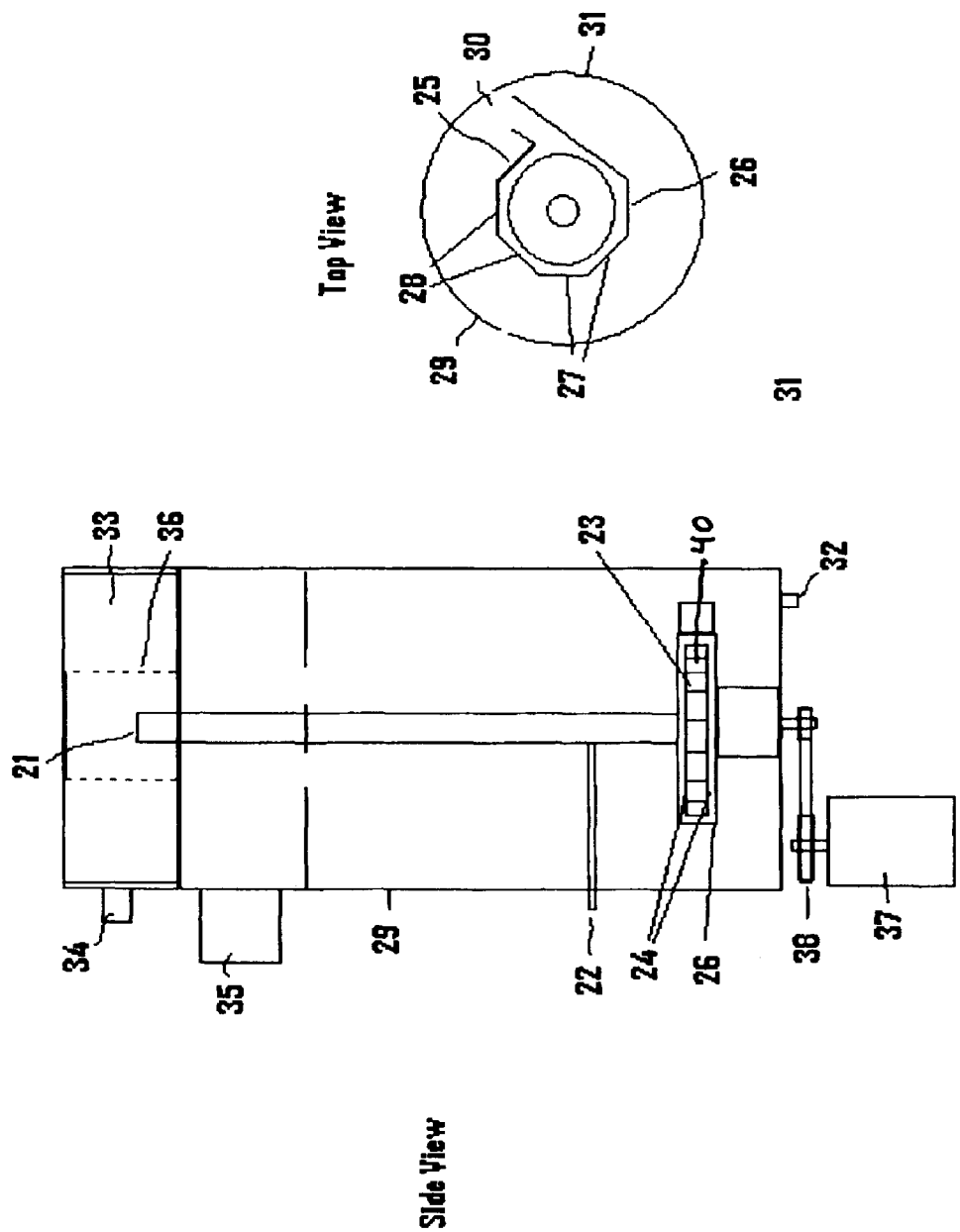
FIG. 1 is a side cutaway view of the invention.
Figure 2:
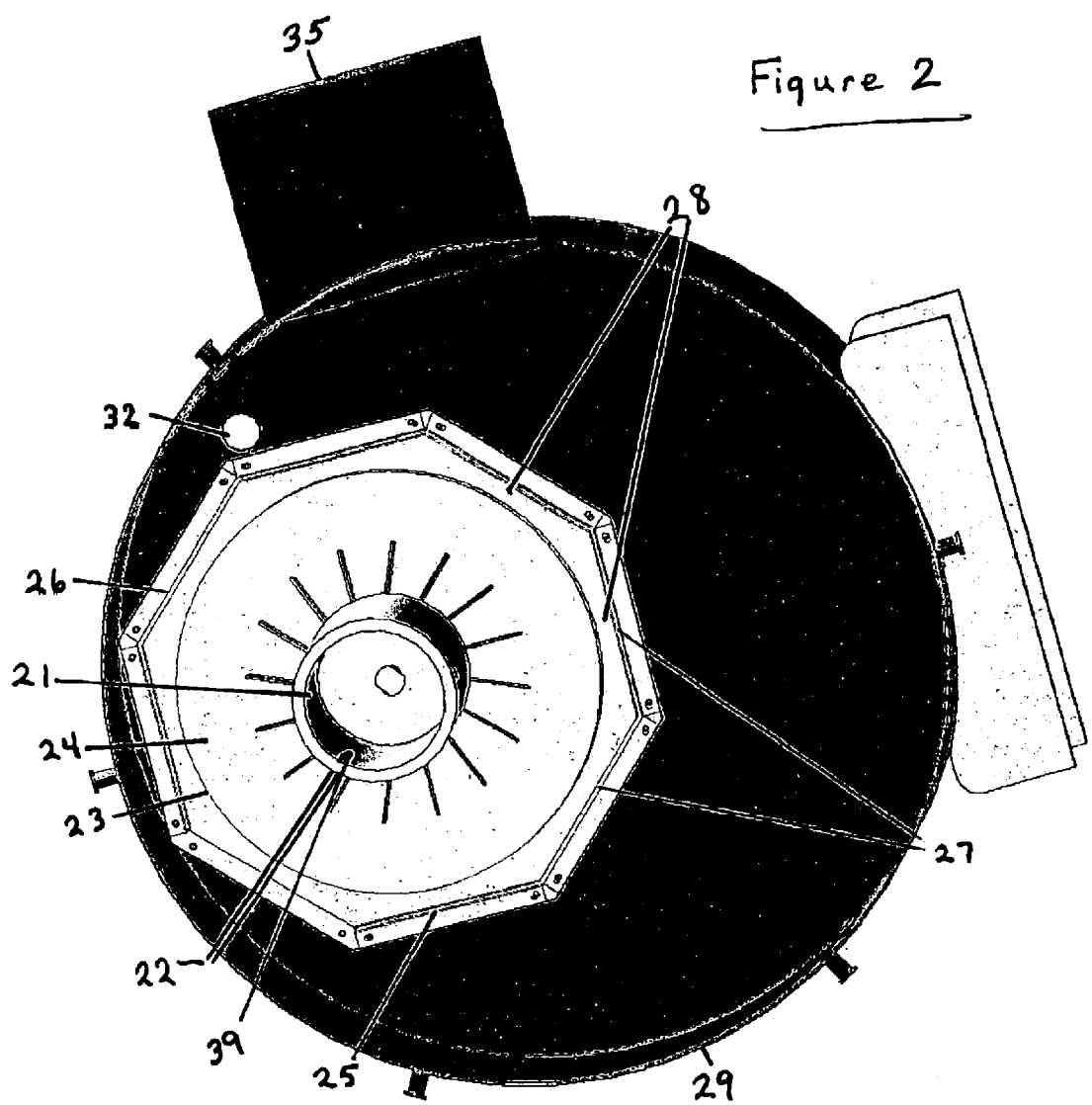
FIG. 2 is a top view of the invention, illustrating the configuration and functions of the impeller, the housing and the demister.
Figure 3:
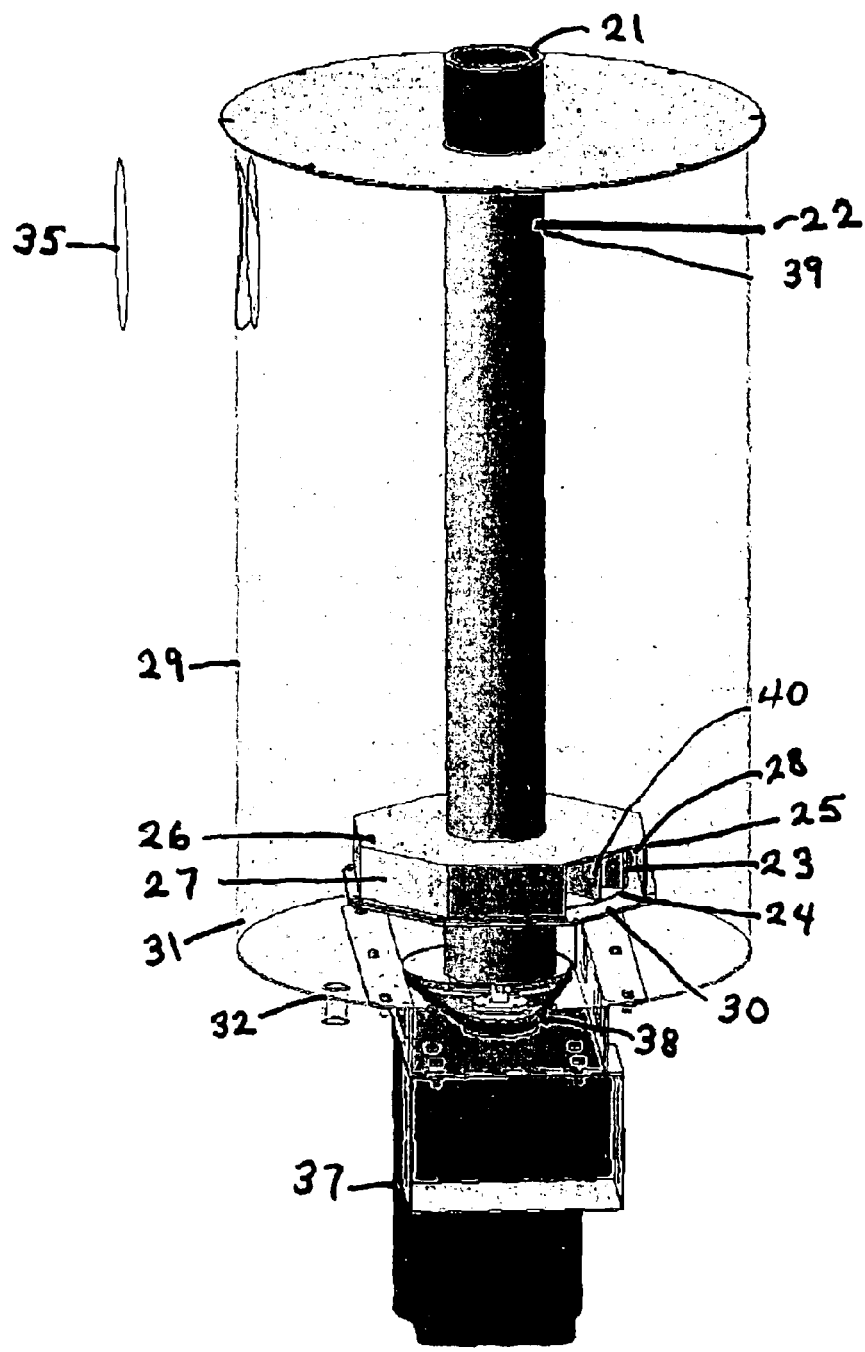
FIG. 3 is a perspective view of the invention.

Initially referring to FIGS. 1, 2 and 3, a filterless air purifier and vacuum system is depicted. In accordance with the present invention, there is shown in FIG. 1 a side cutaway view of the device showing a comprising of all of its parts.

Turning to FIG. 1, the device includes a round, cylindrical high pressure demister tank or chamber 29 with substantially higher interior pressure than occurs inside the impeller housing 27, created by the energy of the motor 37 powered impeller 23, representing the enclosure of the remaining parts, with the exception of the motor and drives, which are in the bottom of the tank and outside of the enclosure tank 29; a suction inlet means 21 where air containing airborne particles is introduced to a motor powered impeller 23, a tube or pipe 22 with an orifice 39 where fluid is introduced to the inlet suction means, an impeller assembly 23 with enclosed sides 24 with vanes or paddles 40 rotating inside a multisided housing 27 where droplets are impacted on an anvil impaction means 25 and thereby splatter continuously, reducing them to microscopic sized droplets smaller than 10 microns in diameter. Particles are passed through a low pressure media, created by accelleration of the impeller 23 driving said droplets through narrow passages 28, which is crowded with said microscopic droplets and are substantially collided and wetted by contact with the surfaces of said microscopic droplets and thereby transferring the particles from the air to the fluid, the impeller then discharging the particle laden fluid and the purified air together tangentially to the interior rounded wall of the demister tank 29 causing a re-entrainment of said fluid droplets with said fluid. At the bottom of said demister tank 29 a drain 32 is provided for discharging particle laden fluid and an outlet vent 35 on the upper side or top of said demister tank 29 for attaching ducts for transfering purified air to its original space. FIG. 1 also shows the path and direction of flow of both particle laden air and a fluid used for collection of particles contained in said air.

The process of the inlet 21, the impeller 23 and housing 26 components of the invention are best illustrated by the following facts:

A 3,000 micron drop of water, such as is released by a dripping faucet, when dropped 18 inches onto a hard surface will break into 10 droplets, approximately 1400 microns in diameter. If the distance of fall, and subsequently the force if impact is increased, the number of droplets is also increased. Each time a droplet is reduced in diameter by one half its original diameter there are eight droplets created, exposing four times as much surface as the original droplet. A garden hose nozzle is capable of producing droplets as small as about 40 microns. Atomizing droplets with either higher pressure or acceleration will elongate and break them apart into smaller droplets, as small as 10 microns in diameter. Splattering the 10 micron droplets created by atomization by an impeller 23 onto an anvil 25 will further reduce the droplet diameters and equivalently increase the amount of surface area exposed, thereby defeating the surface tension of the fluid and exposing exponentially more surface area for dry particles to become attached. The smaller the droplets created, the less fluid required to contact all of the dry particles in an air stream. Crowding the transfer media contained in the impeller housing 26 with microscopic droplets created by by the atomizer impeller 23 and impacting on an interior anvil 25 and then passing them through multiple narrowed zones or passages 28 in a multiple sided impeller housing 27 makes it practically impossible for particles to pass through said transfer media without colliding with droplets and subsequently becoming wetted and absorbed into said fluid, removing them from the air and transfering them into said fluid, which is subsequently discharged down a drain, thereby substantially purifying the air, eliminating the need for fitters or plates as particle collection means.

Turning to FIG. 2, there is presented a top open view of the device illustrating the configuration and operation of the impeller 23 and most especially the housing of the impeller 23 with its multiple flat sides 27 and multiple narrow passages 28 through which droplets are first atomized by the impeller 26 and splattered tangentially on an anvil 25 and substantially reduced further in size, then the particles and droplets travel together through the multiple narrow passages 28 where surface tension of the fluid is further relieved by the substantially increased velocity and lowered pressure of the narrow passages 28, much in the same manner and applying multiple stages of the principals used in the narrow neck of a venturi scrubber.

FIG. 3 is a perspective view of the device, illustrating the invention and the application of all of the functions of its parts. The perspective view is showing all of the parts in relationship with one another, including the suction inlet 21 which introduces the particle laden air to the impeller 26 along with fluid introduction means through a tube or pipe 22 and orifice 39 and into said suction inlet means 21. The illustrations depicted in FIGS. 1, 2 and 3 are showing one way to accomplish the processes of suction, conveyance, droplet size reduction, air to fluid particle transfer, mixing, discharge, demisting or air/water separations. Tap water or other fluids or a combination thereof either introduced from new sources such as a water line or from baths or other containment means and/or component shapes such as hexagonal square, oval, or other could accomplish the function of the invention by adhering to the general principals and applications of the invention herein described. The device as described and illustrated was invented to accomplish both air purification and wet or dry vacuum cleaning simultaneously although it is not necessary to use the vacuum cleaning function of the device in order to perform air purification.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A filterless air purifying and vacuum cleaning device, comprising a powered impeller with multiple paddles or vanes for substantially atomizing fluid droplets simultaneously with transferring air, a tube with an orifice to introduce fluid into the impeller, and an impeller housing having multiple narrowed low pressure zones to reduce fluid surface tension, whereby dry particles become substantially wetted and discharged.

2. The device of claim 1, further including an inlet tube or pipe for conveyance of air into the impeller.

3. The device of claim 1, wherein the impeller includes flat paddles or vanes, with enclosed sides to contain, control and direct fluid flow.

4. The device of claim 1, further including an impaction means to splatter atomized droplets from the impeller to an anvil, substantially reducing them to smaller droplets.

5. The device of claim 1, further including a high pressure air/fluid demisting chamber for droplet re-entrainment, comprising an air inlet, an air outlet and a fluid drain with a means for containing and operating said housing and impeller inside said demisting chamber.

6. The device of claim 1, further including a drain means for continuously discharging particle laden fluids, eliminating the need for water baths, filters or collection plates.

7. The device of claim 1, further including a means for attaching a central vacuum network to an air purification device to be used for either wet or dry cleaning of carpets and furnishings.

8. The device of claim 1, further including a vacuum head with a screen to trap large objects, allowing small particles to pass into a suction means of said air purification device.

* * * * *